United States Patent
Kaneko et al.

(10) Patent No.: US 9,540,011 B2
(45) Date of Patent: Jan. 10, 2017

(54) WORK VEHICLE AND METHOD OF CONTROLLING WORK VEHICLE

(71) Applicant: Komatsu Ltd., Tokyo (JP)

(72) Inventors: Shinji Kaneko, Oyama (JP); Yoshitaka Onodera, Hiratsuka (JP); Yoshifumi Shitara, Hiratsuka (JP); Taishi Oiwa, Naka-gun (JP); Jun Hashimoto, Chigasaki (JP)

(73) Assignee: Komatsu Ltd., Tokyo (JP)

( * ) Notice: Subject to any disclaimer, the term of this patent is extended or adjusted under 35 U.S.C. 154(b) by 23 days.

(21) Appl. No.: 14/419,337

(22) PCT Filed: Sep. 18, 2014

(86) PCT No.: PCT/JP2014/074749
§ 371 (c)(1),
(2) Date: Feb. 3, 2015

(87) PCT Pub. No.: WO2016/042648
PCT Pub. Date: Mar. 24, 2016

(65) Prior Publication Data
US 2016/0082966 A1    Mar. 24, 2016

(51) Int. Cl.
*B60W 30/188* (2012.01)
*B60W 30/18* (2012.01)

(52) U.S. Cl.
CPC ...... *B60W 30/188* (2013.01); *B60W 30/18045* (2013.01); *B60W 2300/121* (2013.01);
(Continued)

(58) Field of Classification Search
CPC .................. B60W 30/188; B60W 30/18045; B60W 2300/121; B60W 2520/06; B60W 2520/04; B60W 2720/30
See application file for complete search history.

(56) References Cited

U.S. PATENT DOCUMENTS

| 6,277,050 B1 | 8/2001 | Nakagawa et al. |
| 8,442,729 B2 | 5/2013 | Tsukada et al. |
| (Continued) | | |

FOREIGN PATENT DOCUMENTS

| CN | 101680381 A | 3/2010 |
| JP | 06-058178 A | 3/1994 |
| (Continued) | | |

OTHER PUBLICATIONS

International Search Report and Written Opinion dated Dec. 22, 2014, issued for PCT/JP2014/074749.

*Primary Examiner* — Rodney Butler
*Assistant Examiner* — Frederick Brushaber
(74) *Attorney, Agent, or Firm* — Locke Lord LLP (57) ABSTRACT

A work vehicle includes a variable displacement hydraulic pump driven by an engine, a hydraulic motor forming a closed circuit with the pump and driven by hydraulic fluid discharged from the pump, wheels driven by the motor to allow the work vehicle to travel, a selector detecting an operating state of a switch switching the traveling of the work vehicle between forward and backward, and a controller. When the selector detects a reversal operation of the switch to reverse the traveling direction when the work vehicle travels, the controller sets relationship between the vehicle speed of the work vehicle and the upper limit of the rotational speed of the engine such that the upper limit increases as the absolute value of the vehicle speed approaches zero. The controller obtains an upper limit of the rotational speed from the relationship and a vehicle speed of the work vehicle.

7 Claims, 6 Drawing Sheets

(52) U.S. Cl.
CPC ..... *B60W 2520/04* (2013.01); *B60W 2520/06* (2013.01); *B60W 2720/30* (2013.01)

(56) References Cited

U.S. PATENT DOCUMENTS

| | | | | |
|---|---|---|---|---|
| 8,655,557 | B2* | 2/2014 | Hyodo | B60W 10/06 |
| | | | | 477/110 |
| 9,091,221 | B2* | 7/2015 | Hyodo | E02F 9/2025 |
| 2003/0233186 | A1* | 12/2003 | Chess | B60W 10/02 |
| | | | | 701/95 |
| 2005/0282682 | A1* | 12/2005 | Ishii | B60W 10/06 |
| | | | | 477/107 |
| 2009/0029826 | A1* | 1/2009 | Eguchi | B60T 7/02 |
| | | | | 477/39 |
| 2010/0138118 | A1 | 6/2010 | Tsukada et al. | |
| 2011/0313627 | A1* | 12/2011 | Ishikawa | F16H 61/16 |
| | | | | 701/51 |
| 2012/0109478 | A1* | 5/2012 | Mochiyama | B60W 10/02 |
| | | | | 701/68 |
| 2013/0085036 | A1* | 4/2013 | Anderson | B60W 10/06 |
| | | | | 477/110 |
| 2013/0158838 | A1* | 6/2013 | Yorke | B60W 10/06 |
| | | | | 701/103 |

FOREIGN PATENT DOCUMENTS

| | | |
|---|---|---|
| JP | 2000-248975 A | 9/2000 |
| JP | 2006-322413 A | 11/2006 |
| JP | 2009-041533 A | 2/2009 |
| JP | 4432832 B2 | 3/2010 |
| JP | 2011-002049 A | 1/2011 |

\* cited by examiner

| Vc | -V5 | -V4 | 0 | +V4 | +V5 |
|---|---|---|---|---|---|
| Acmax (%) | 0 | 100 | 100 | 100 | 0 |

FIG.8

WORK VEHICLE AND METHOD OF CONTROLLING WORK VEHICLE

FIELD

The present invention relates to a work vehicle including a variable displacement hydraulic pump, driven by an engine, and a hydraulic motor, forming a closed circuit with the hydraulic pump and driven by hydraulic fluid discharged from the hydraulic pump, and a method of controlling the work vehicle.

BACKGROUND

There are forklift trucks equipped with a hydraulic driving device referred to as an HST (Hydro Static Transmission) between a power source, i.e. an engine, and driven wheels. The HST includes a variable displacement travel hydraulic pump, driven by the engine, and a variable displacement hydraulic motor, driven by hydraulic fluid discharged by the travel hydraulic pump, in a main hydraulic circuit, which is a closed circuit, and transmits the driving power of the hydraulic motor to the driven wheels to enable a vehicle to travel.

A work vehicle, such as a forklift truck, is operated to perform switch-back, in which its forward-backward lever is operated from a backward position to a forward position while the vehicle is traveling backward, or the forward-backward lever is operated from the forward position to the backward position while the vehicle is traveling forward, so that the vehicle slows down until it stops traveling backward or forward and, immediately after that, the vehicle travels forward or backward with increasing speed (see Patent Literature 1, for example).

CITATION LIST

Patent Literature

Patent Literature 1: Japanese Laid-open Patent Publication No. 06-58178

SUMMARY

Technical Problem

The technique described in Patent Literature 1 does not restrict the rotational speed of the engine with respect to the operation on the accelerator pedal during the switch-back, possibly leading to a waste of fuel.

An object of the invention is to curb an increase in fuel consumption of a work vehicle equipped with an HST during a switch-back operation.

Solution to Problem

According to the present invention, a work vehicle provided with an implement, the work vehicle comprises: an engine; a variable displacement travel hydraulic pump configured to be driven by the engine; a hydraulic motor forming a closed circuit with the travel hydraulic pump and configured to be driven by hydraulic fluid discharged from the travel hydraulic pump; a driven wheel configured to be driven by the hydraulic motor to allow the work vehicle to travel; a selector switch configured to detect an operating state of a traveling direction switching device configured to switch a traveling of the work vehicle between forward and backward; and a control device configured to set, in a case in which the selector switch detects a reversal operation of the traveling direction switching device to reverse a traveling direction of the work vehicle when the work vehicle travels, a relationship between a vehicle speed of the work vehicle and an upper limit of a rotational speed of the engine in a manner such that the upper limit increases as an absolute value of the vehicle speed approaches zero, the control device being configured to obtain an upper limit of a rotational speed of the engine from the set relationship and a vehicle speed of the work vehicle.

In the present invention, it is preferable that the control device sets, in a case in which the selector switch detects that the traveling direction switching device is operated into a neutral position when the work vehicle travels, the upper limit of the rotational speed of the engine to increase so as to be larger than when the reversal operation is detected, in a range to zero from an absolute value of a vehicle speed larger than when the reversal operation is detected.

In the present invention, it is preferable that the control device uses, in a case in which an abnormality has occurred in a device that detects the vehicle speed and in which the reversal operation is detected, the smaller of a predetermined upper limit of the rotational speed of the engine and a rotational speed of the engine obtained from a upper limit set in the relationship for use when the reversal operation is detected and the vehicle speed.

In the present invention, it is preferable that the relationship for use when the reversal operation is detected is set in a manner such that the upper limit of the rotational speed of the engine is zero in a range to a first vehicle speed and that the upper limit of the rotational speed of the engine increases as the absolute value of the vehicle speed approaches zero in a range from the first vehicle speed, inclusive, to zero.

In the present invention, it is preferable that the work vehicle is a forklift truck.

According to the present invention, a method of controlling a work vehicle, the work vehicle including an implement, an engine, a variable displacement travel hydraulic pump configured to be driven by the engine, a hydraulic motor forming a closed circuit with the travel hydraulic pump and configured to be driven by hydraulic fluid discharged from the travel hydraulic pump, a driven wheel configured to be driven by the hydraulic motor, a selector switch configured to detect an operating state of a traveling direction switching device configured to switch traveling of the work vehicle between forward and backward, the method comprises: detecting an operation on the traveling direction switching device when the work vehicle travels; setting, in a case in which the selector switch detects a reversal operation of the traveling direction switching device to reverse a traveling direction of the work vehicle when the work vehicle travels, a relationship between a vehicle speed of the work vehicle and an upper limit of a rotational speed of the engine in a manner such that the upper limit increases as an absolute value of the vehicle speed approaches zero; and obtaining an upper limit of a rotational speed of the engine from the relationship and a vehicle speed of the work vehicle.

An increase in fuel consumption of a work vehicle equipped with an HST during a switch-back operation can be curbed through the invention.

DESCRIPTION OF EMBODIMENTS

An embodiment of the invention will now be described with reference to the drawings.

<Forklift Truck>

Figure 1:
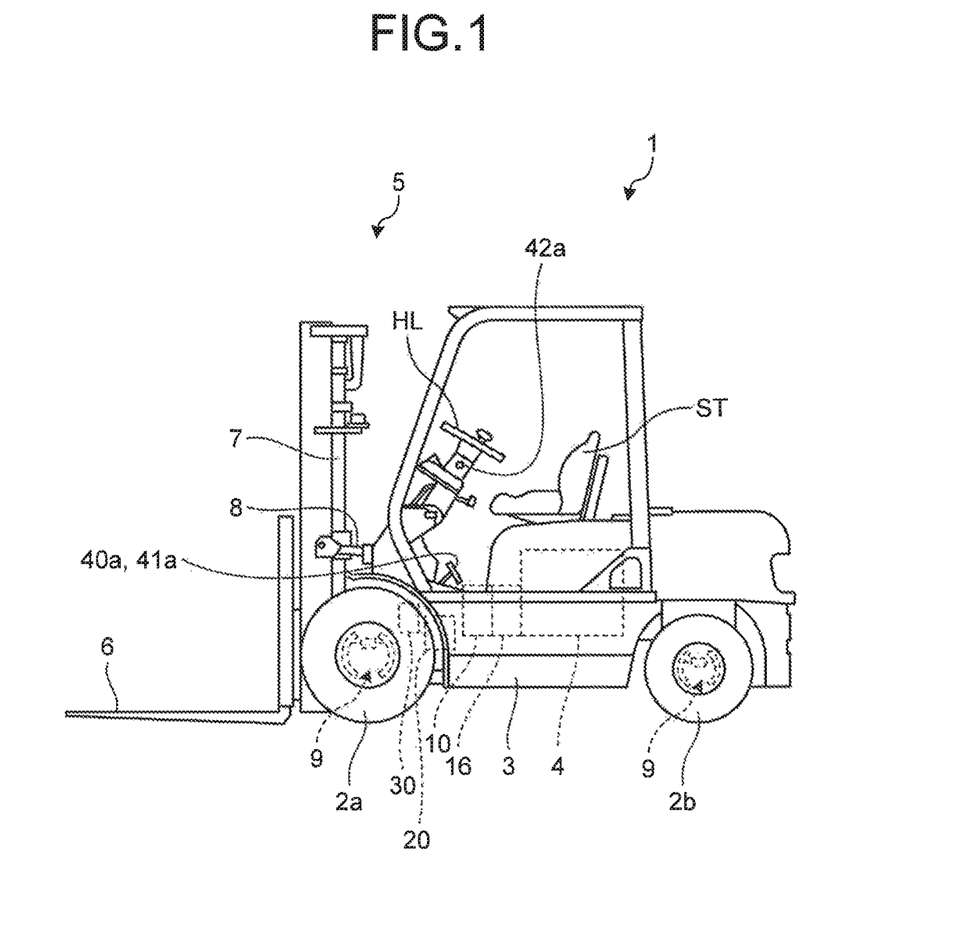
FIG. 1 is a diagram of an overall arrangement of a forklift truck according to an embodiment.
Figure 2:
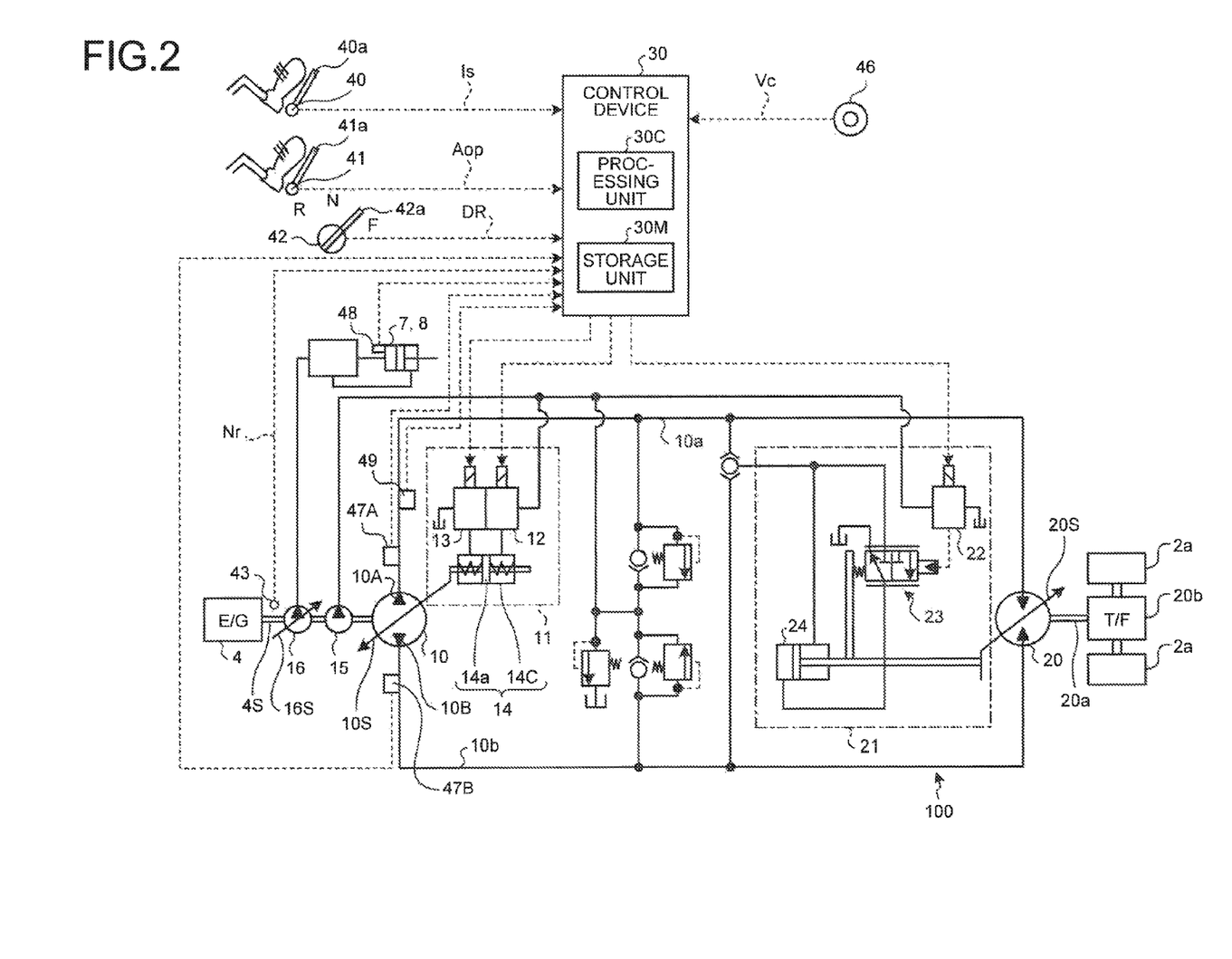
FIG. 2 is a block diagram of a control system for the forklift truck 1 illustrated in FIG. 1.

FIG. 1 is a diagram of an overall arrangement of a forklift truck 1 according to an embodiment. FIG. 2 is a block diagram of a control system for the forklift truck 1 illustrated in FIG. 1. The forklift truck 1 includes a body 3 provided with driven wheels 2a and steered wheels 2b, an implement 5, and mechanical brakes 9 configured to slow down and stop the driven wheels 2a and the steered wheels 2b. The direction from a driver seat ST to a steering device HL points to the front of the forklift truck 1, and the direction from the steering device HL to the driver seat ST points to the rear of the vehicle. The implement 5 is mounted on the body 3 at the front.

The body 3 is provided with an internal combustion engine, such as an engine 4, a variable displacement travel hydraulic pump 10 driven by a power source, i.e. the engine 4, and an implement hydraulic pump 16. The engine 4 may be, but not limited to, a diesel engine. The travel hydraulic pump 10 and the implement hydraulic pump 16 are coupled to an output shaft 4S of the engine 4. The travel hydraulic pump 10 and the implement hydraulic pump 16 are driven via the output shaft 4S by the engine 4. The driven wheels 2a are driven by the power of a hydraulic motor 20. The variable displacement travel hydraulic pump 10 and the variable displacement hydraulic motor 20 communicate with each other in a closed hydraulic circuit to form an HST. The forklift truck 1 travels through the HST as described above. In this embodiment, the travel hydraulic pump 10 and the implement hydraulic pump 16 include a swash plate 10S and a swash plate 16S, respectively, and their displacements change with changes to the inclination angles of the swash plate 10S and the swash plate 16S.

The implement 5 includes a lift cylinder 7, configured to raise and lower a fork 6 that receives a load, and a tilt cylinder 8, configured to tilt the fork 6. The driver seat in the body 3 is provided with a forward-backward lever 42a, an inching pedal (brake pedal) 40a serving as a brake control, an accelerator pedal 41a serving as an acceleration control, and undepicted implement control levers including a lift lever and a tilt lever for operating the implement 5. The inching pedal 40a is for controlling an inching rate. The accelerator pedal 41a is for changing the amount of fuel supplied to the engine 4. The inching pedal 40a and the accelerator pedal 41a are each placed at a position that allows an operator of the forklift truck 1 to depress each pedal with a foot from the driver seat. In FIG. 1, the inching pedal 40a and the accelerator pedal 41a are illustrated overlapping with each other.

As illustrated in FIG. 2, the forklift truck 1 includes a main hydraulic circuit 100. The main hydraulic circuit 100 is a closed circuit including the travel hydraulic pump 10, the hydraulic motor 20, and hydraulic supply lines 10a and 10b that connect the travel hydraulic pump 10 and the hydraulic motor 20. The travel hydraulic pump 10 is driven by the engine 4 to discharge hydraulic fluid. In this embodiment, the travel hydraulic pump 10 is a variable displacement pump that allows its displacement to be changed with, for example, a change to the swash plate inclination angle.

The hydraulic motor 20 is rotated by the hydraulic fluid discharged from the travel hydraulic pump 10. The hydraulic motor 20 is a variable displacement hydraulic motor that includes, for example, a swash plate 20S and allows its displacement to be changed with a change to the swash plate inclination angle. The hydraulic motor 20 may be a fixed displacement hydraulic motor. The hydraulic motor 20 includes an output shaft 20a connected through a transfer device 20b to the driven wheels 2a. The hydraulic motor 20 enables the forklift truck 1 to travel by driving the driven wheels 2a through the transfer device 20b.

The hydraulic motor 20 is capable of switching its rotational direction in response to the direction in which the hydraulic fluid from the travel hydraulic pump 10 is supplied to the hydraulic motor 20. By switching the rotational direction of the hydraulic motor 20, the forklift truck 1 can travel forward or backward. For convenience of description, the forklift truck 1 travels forward when the hydraulic fluid is supplied from the hydraulic supply line 10a to the hydraulic motor 20, and the forklift truck 1 travels backward when the hydraulic fluid is supplied from the hydraulic supply line 10b to the hydraulic motor 20 hereinafter.

The travel hydraulic pump 10 has a port A 10A, connected to the hydraulic supply line 10a, and a port B 10B, connected to the hydraulic supply line 10b. When the forklift truck 1 travels forward, the port A 10A serves as an outlet port of the hydraulic fluid, and the port B 10B serves as an inlet port of the hydraulic fluid. When the forklift truck 1 travels backward, the port A 10A serves as the inlet port of the hydraulic fluid, and the port B 10B serves as the outlet port of the hydraulic fluid.

The forklift truck 1 includes a pump displacement setting unit 11, a motor displacement setting unit 21, and a charge pump 15. The pump displacement setting unit 11 is provided for the travel hydraulic pump 10. The pump displacement setting unit 11 includes a forward pump electromagnetic proportional control valve 12, a backward pump electromagnetic proportional control valve 13, and a pump displacement controlling cylinder 14. The forward pump electromagnetic proportional control valve 12 and the backward pump electromagnetic proportional control valve 13 in the pump displacement setting unit 11 receive command signals from a control device 30, which will be described hereinafter. The pump displacement controlling cylinder 14 in the pump displacement setting unit 11 operates in response to the command signals from the control device 30 to change the swash plate inclination angle of the travel hydraulic pump 10 and thereby change the displacement of the travel hydraulic pump 10.

The pump displacement controlling cylinder 14 includes a cylinder case 14C and a piston 14a that is stored in the cylinder case 14C. The piston 14a reciprocates in the cylinder case 14C as the hydraulic fluid is supplied into a space between the cylinder case 14C and the piston 14a. The piston 14a in the pump displacement controlling cylinder 14 is retained at its neutral position with the swash plate inclination angle at zero. In this situation, no hydraulic fluid is discharged to the hydraulic supply line 10a or to the hydraulic supply line 10b of the main hydraulic circuit 100 from the travel hydraulic pump 10, even with the engine 4 running.

With the swash plate inclination angle of the travel hydraulic pump 10 at zero, for example, the control device 30 sends a command signal to increase the displacement of the travel hydraulic pump 10 to the forward pump electromagnetic proportional control valve 12. Responding to this command signal, the forward pump electromagnetic proportional control valve 12 supplies a pump controlling pressure to the pump displacement controlling cylinder 14. As a result, the piston 14a moves to the left in FIG. 2. As the piston 14a of the pump displacement controlling cylinder 14 moves to the left in FIG. 2, the swash plate 10S of the travel hydraulic pump 10 is inclined in conjunction with this movement to a direction in which the hydraulic fluid is discharged to the hydraulic supply line 10a.

The movement of the piston 14a increases with an increase in pump controlling pressure from the forward pump electromagnetic proportional control valve 12. The amount of change in inclination angle of the swash plate 10S of the travel hydraulic pump 10 increases accordingly. In other words, the control device 30 sends a command signal to the forward pump electromagnetic proportional control valve 12, which in turn supplies a pump controlling pressure according to the command signal to the pump displacement controlling cylinder 14. The pump controlling pressure enables the pump displacement controlling cylinder 14 to operate, causing the swash plate 10S of the travel hydraulic pump 10 to incline so that a predetermined amount of the hydraulic fluid is discharged to the hydraulic supply line 10a. As a result, with the engine 4 running, the travel hydraulic pump 10 discharges the hydraulic fluid to the hydraulic supply line 10a, enabling the hydraulic motor 20 to rotate in a forward direction.

If the control device 30 sends to the forward pump electromagnetic proportional control valve 12 a command signal to reduce the displacement of the travel hydraulic pump 10 in the condition described above, the forward pump electromagnetic proportional control valve 12 supplies to the pump displacement controlling cylinder 14 a reduced pump controlling pressure according to the command signal. This causes the piston 14a of the pump displacement controlling cylinder 14 to move toward the neutral position. This reduces the swash plate inclination angle of the travel hydraulic pump 10, reducing the amount of the hydraulic fluid discharged from the travel hydraulic pump 10 to the hydraulic supply line 10a.

If the control device 30 sends to the backward pump electromagnetic proportional control valve 13 a command signal to increase the displacement of the travel hydraulic pump 10, the backward pump electromagnetic proportional control valve 13 supplies to the pump displacement controlling cylinder 14 a pump controlling pressure according to the command signal. The piston 14a, then, moves to the right in FIG. 2. As the piston 14a of the pump displacement controlling cylinder 14 moves to the right in FIG. 2, the swash plate 10S of the travel hydraulic pump 10 is inclined in conjunction with this movement to a direction in which the hydraulic fluid is discharged to the hydraulic supply line 10b.

The movement of the piston 14a increases with an increase in pump controlling pressure supplied from the backward pump electromagnetic proportional control valve 13, thereby increasing the amount of change in swash plate inclination angle of the travel hydraulic pump 10. In other words, the control device 30 sends a command signal to the backward pump electromagnetic proportional control valve 13, which in turn supplies a pump controlling pressure according to the command signal to the pump displacement controlling cylinder 14. The pump displacement controlling cylinder 14 operates to cause the swash plate 10S of the travel hydraulic pump 10 to incline so that a desired amount of the hydraulic fluid is discharged to the hydraulic supply line 10b. As a result, with the engine 4 running, the travel hydraulic pump 10 discharges the hydraulic fluid to the hydraulic supply line 10b, enabling the hydraulic motor 20 to rotate in a backward direction.

If the control device 30 then sends to the backward pump electromagnetic proportional control valve 13 a command signal to reduce the displacement of the travel hydraulic pump 10, the backward pump electromagnetic proportional control valve 13 supplies to the pump displacement controlling cylinder 14 a reduced pump controlling pressure according to the command signal, causing the piston 14a to move toward the neutral position. This reduces the swash plate inclination angle of the travel hydraulic pump 10, reducing the amount of the hydraulic fluid discharged from the travel hydraulic pump 10 to the hydraulic supply line 10b.

The motor displacement setting unit 21 is provided for the hydraulic motor 20. The motor displacement setting unit 21 includes a motor electromagnetic proportional control valve 22, a motor cylinder controlling valve 23, and a motor displacement controlling cylinder 24. The control device 30 sends a command signal to the motor electromagnetic proportional control valve 22 of the motor displacement setting unit 21, and the motor electromagnetic proportional control valve 22 supplies a motor controlling pressure to the motor cylinder controlling valve 23 and thereby enables the motor displacement controlling cylinder 24 to operate. As the motor displacement controlling cylinder 24 operates, the swash plate inclination angle of the hydraulic motor 20 is changed in conjunction with the movement of the motor displacement controlling cylinder 24. Thus, the displacement of the hydraulic motor 20 is changed in response to the command signal from the control device 30. Specifically, in the motor displacement setting unit 21, the swash plate inclination angle of the hydraulic motor 20 is reduced with an increase in motor controlling pressure supplied from the motor electromagnetic proportional control valve 22.

The charge pump 15 is driven by the engine 4. The charge pump 15 supplies the pump controlling pressure through the forward pump electromagnetic proportional control valve 12 and the backward pump electromagnetic proportional control valve 13 to the pump displacement controlling cylinder 14. The charge pump 15 has a function to supply the motor controlling pressure through the motor electromagnetic proportional control valve 22 to the motor cylinder controlling valve 23.

In this embodiment, the engine 4 drives the implement hydraulic pump 16 in addition to the travel hydraulic pump 10. The implement hydraulic pump 16 supplies hydraulic fluid to work actuators for driving the implement 5, i.e. the lift cylinder 7 and the tilt cylinder 8.

The forklift truck 1 includes an inching potentiometer (brake potentiometer) 40, an accelerator potentiometer 41, a forward-backward lever switch 42, an engine speed sensor 43, a vehicle speed sensor 46, pressure sensors 47A and 47B, a pressure sensor 48, and a temperature sensor 49.

The inching potentiometer 40 senses and outputs the amount of operation on the inching pedal (brake pedal) 40a when the pedal is operated. The amount of operation on the inching pedal 40*a* is represented by the amount of inching operation Is. The amount of inching operation Is output by the inching potentiometer 40 is input into the control device 30. The amount of inching operation Is may be also referred to as an inching stroke Is in the description below.

The accelerator potentiometer 41 outputs the amount of operation Aop on the accelerator pedal 41*a* when the accelerator pedal 41*a* is operated. The amount of operation Aop on the accelerator pedal 41*a* may be also referred to as an acceleration opening Aop. The acceleration opening Aop output by the accelerator potentiometer 41 is input into the control device 30.

The forward-backward lever switch 42 is a selector switch for switching the traveling direction of the forklift truck 1 between forward and backward. In this embodiment, by operating the forward-backward lever 42*a*, provided in a position that allows for operation from the driver seat, to select one of three traveling directions of forward, neutral, and backward, the forward-backward lever switch 42 allows the forklift truck 1 to switch between traveling forward and backward. The forward-backward lever 42*a* is a traveling direction switching device for switching the traveling direction of the forklift truck 1 between forward and backward. The forward-backward lever switch 42 sends information indicative of the traveling direction of the forklift truck 1, selected by the forward-backward lever switch 42, to the control device 30 in the form of a traveling direction command value DR. The traveling direction command value DR may be F representing forward, N representing neutral, and R representing backward. The traveling directions of the forklift truck 1, selected by the forward-backward lever switch 42, include the directions in which the forklift truck 1 is about to travel and the direction in which the forklift truck 1 is actually traveling.

The engine speed sensor 43 senses the actual rotational speed of the engine 4. The rotational speed of the engine 4 sensed by the engine speed sensor 43 is an actual rotational speed Nr of the engine 4. The information indicative of the rotational speed Nr of the engine 4 is input into the control device 30. The rotational speed of the engine 4 is the number of revolutions per unit time of the output shaft 4S of the engine 4. The vehicle speed sensor 46 senses a vehicle speed Vc, which is the speed at which the forklift truck 1 travels.

The pressure sensor 47A is provided on the hydraulic supply line 10*a* to sense the pressure of the hydraulic fluid in the hydraulic supply line 10*a*. The pressure sensor 47B is provided on the hydraulic supply line 10*b* to sense the pressure of the hydraulic fluid in the hydraulic supply line 10*b*. The pressure sensed by the pressure sensor 47A corresponds to the pressure of the hydraulic fluid inside the port A 10A of the travel hydraulic pump 10. The pressure sensed by the pressure sensor 47B corresponds to the pressure of the hydraulic fluid inside the port B 10B of the travel hydraulic pump 10. The control device 30 acquires values sensed by the pressure sensor 47A and the pressure sensor 47B for use in a method of controlling the work vehicle according to the embodiment. The pressure sensor 48 is a lifting pressure sensing device to sense a lifting pressure in the lift cylinder 7, which is the pressure of the hydraulic fluid in the lift cylinder 7. The temperature sensor 49 is a temperature sensing device to sense a temperature of the hydraulic fluid in the HST.

The control device 30 includes a processing unit 30C and a storage unit 30M. The control device 30 is provided with, for example, a computer and executes various processes to control the forklift truck 1. The processing unit 30C is a device combining, for example, a CPU (Central Processing Unit) and a memory. The processing unit 30C reads a computer program, stored in the storage unit 30M, for controlling the main hydraulic circuit 100 and executes an instruction written in the program to control the operation of the main hydraulic circuit 100. The storage unit 30M stores the computer program described above, data, and the like necessary to control the main hydraulic circuit 100. The storage unit 30M is, for example, a ROM (Read Only Memory), a storage device, or a combination thereof.

The control device 30 is electrically connected to sensors, such as the inching potentiometer 40, the accelerator potentiometer 41, the forward-backward lever switch 42, the engine speed sensor 43, the vehicle speed sensor 46, and the pressure sensors 47A and 47B. The control device 30 generates command signals for the forward pump electromagnetic proportional control valve 12 and the backward pump electromagnetic proportional control valve 13 in response to input signals from these sensors and sends the generated command signals to the electromagnetic proportional control valves 12, 13, and 22.

<Switch-Back Operation>

The control device 30 illustrated in FIG. 2 executes a method of controlling the work vehicle according to the embodiment when the forklift truck 1 performs a switch-back operation. The switch-back refers to an operation of the forklift truck 1 performed when the actual traveling direction of the forklift truck 1 is different from a traveling direction defined by the traveling direction command value DR. For example, an operator is driving the forklift truck 1 forward with the forward-backward lever 42*a* in the forward position F while depressing the accelerator pedal 41*a* illustrated in FIG. 1. The switch-back is an operation performed when the operator switches the forward-backward lever 42*a* to the backward position R.

Figure 3:
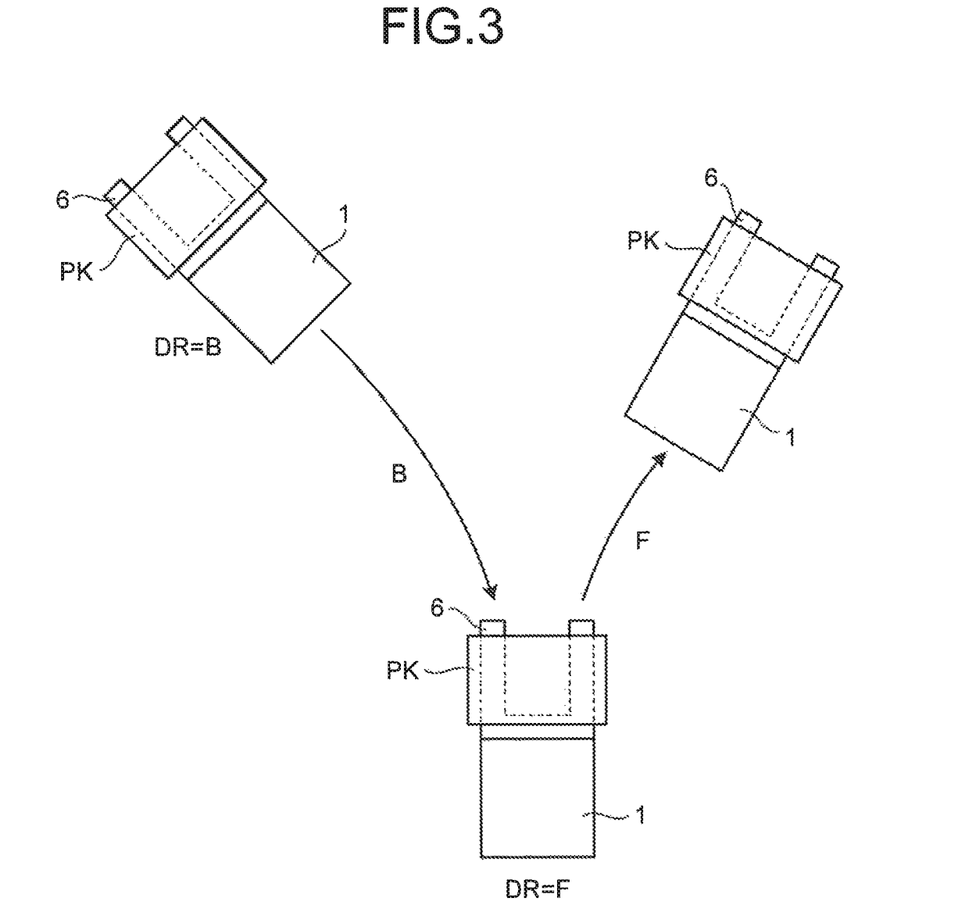
FIG. 3 is a diagram of an example switch-back operation.

FIG. 3 is a diagram of an example switch-back operation. For example, while the forklift truck 1 is traveling backward (the traveling direction command value DR=B) with a package PK loaded, an operator switches the forward-backward lever 42*a* from the backward position to the forward position (the traveling direction command value DR=F) at a certain timing. The forklift truck 1 then starts traveling forward. Such an operation is an example of the switch-back.

<Control Block of Control Device 30>

Figure 4:
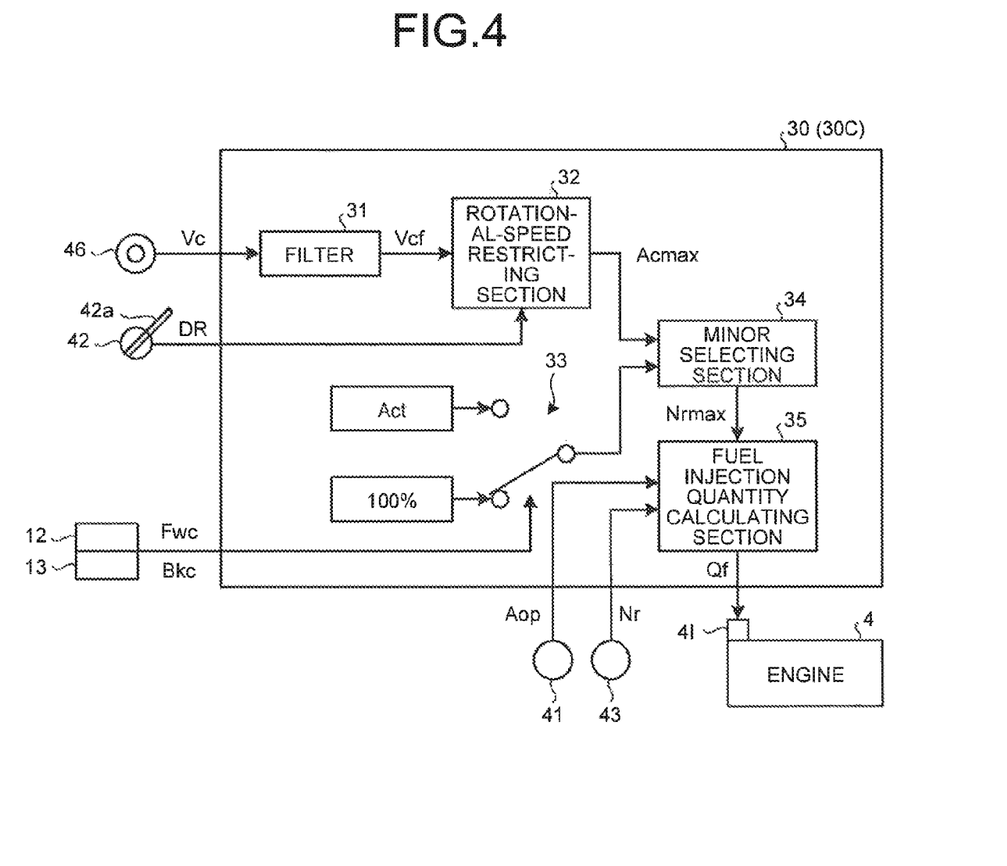
FIG. 4 is a control block diagram of the control device.

FIG. 4 is a control block diagram of the control device 30. The control device 30, or more specifically, the processing unit 30C executes the method of controlling the work machine according to the embodiment during a switch-back operation of the forklift truck 1. The processing unit 30C of the control device 30 includes a filter 31, a rotational-speed restricting section 32, a switching section 33, and a minor selecting section 34.

The filter 31 filters and outputs the vehicle speed Vc of the forklift truck 1 acquired from the vehicle speed sensor 46. In this embodiment, the filter 31, which is a temporary delay filter, receives the vehicle speed Vc acquired from the vehicle speed sensor 46 as an input value and provides an output value Vcf that is after the passage of the filter 31. The filter 31 mitigates fluctuations of the vehicle speed Vc, which may be caused by slippage the forklift truck 1 experiences while the truck is stopping.

The output value Vcf is expressed by, for example, expression (1). In expression (1), f represents a cutoff frequency. The cutoff frequency f is the inverse of a temporary delay time constant $\tau$. A control cycle of the control device 30 is represented by $\Delta t$. An output value of the filter 31 from a cycle just past, i.e. from the previous control cycle, is represented by Vcfb. In this embodiment, the cutoff frequency f is increased for the traveling direction command value DR N in comparison with the traveling direction command value DR F or R output by the forward-backward lever switch 42.

$$Vcf=Vc\times 2\times \pi\times f\times \Delta t/(2\times \pi\times f\times \Delta t+1)+Vcfb/(2\times \pi\times f\times \Delta t+1) \quad (1)$$

Figure 5:
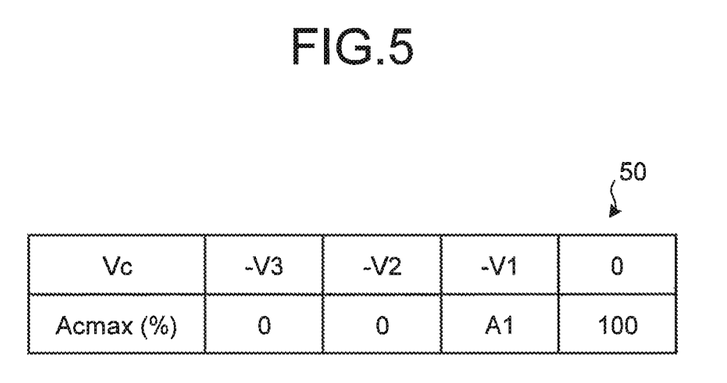
FIG. 5 is a diagram of a table for imposing an upper limit on the rotational speed of an engine during a switch-back operation of the forklift truck.
Figure 6:
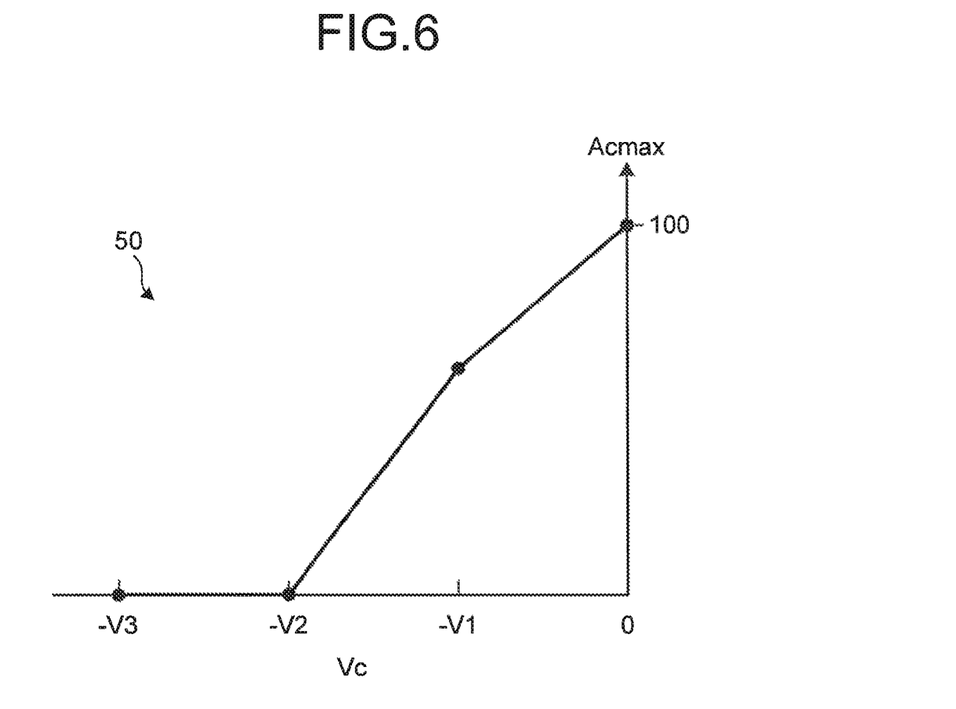
FIG. 6 is a graph plotted from the table illustrated in FIG. 5.

FIG. 5 is a diagram of a table 50 for imposing an upper limit on a rotational speed Nr of the engine 4 during a switch-back operation of the forklift truck 1. FIG. 6 is a graph plotted from the table 50 illustrated in FIG. 5. The rotational-speed restricting section 32 acquires the output value Vcf from the filter 31 and the traveling direction command value DR from the forward-backward lever switch 42. The output value Vcf of the filter 31 corresponds to the vehicle speed Vc. The rotational-speed restricting section 32 determines whether the forklift truck 1 is performing a switch-back operation on the basis of the output value Vcf and the traveling direction command value DR. If the forklift truck 1 is performing a switch-back operation, the rotational-speed restricting section 32 restricts the rotational speed Nr of the engine 4 with respect to the operation on the accelerator pedal 41*a* by the operator. In this embodiment, the rotational-speed restricting section 32 uses, during a switch-back operation of the forklift truck 1, a relationship between the vehicle speed Vc of the forklift truck 1 and the upper limit on the rotational speed Nr of the engine 4 set in a manner such that the upper limit increases as the absolute value of the vehicle speed Vc approaches zero in a range.

The table 50 illustrated in FIG. 5 is stored in the storage unit 30M of the control device 30 illustrated in FIG. 2. The table 50 sets the upper limit Acmax to zero for the vehicle speed Vc from −V3 to −V2, the upper limit Acmax to A1 for the vehicle speed Vc at −V1, and the upper limit Acmax to 100%, i.e., no restriction is imposed, for the vehicle speed Vc at zero. The table 50 illustrated in FIG. 5 provides the settings for the vehicle speed Vc and the upper limit Acmax in a discrete manner, and thus, the upper limit Acmax is obtained through, for example, interpolation where no setting is provided in the table. As a result, the relationship between the vehicle speed Vc and the upper limit Acmax on the rotational speed Nr to be imposed during a switch-back operation is as illustrated in FIG. 6. As described above, it is in the range of the vehicle speed Vc from −V2 to zero that the upper limit Acmax increases as the absolute value of the vehicle speed Vc approaches zero.

When the acceleration opening Aop is defined, the rotational speed Nr of the engine 4 is uniquely defined. Thus, in this embodiment, upper limits are set for the acceleration opening Aop in place of the rotational speed Nr of the engine 4 in order to set the upper limit for the rotational speed Nr. Hence, the upper limit Acmax in the table 50 represents upper limits on the acceleration opening Aop. For example, a 100% depression of the accelerator pedal 41*a* results in a 0% acceleration opening Aop for the vehicle speed Vc up to −V2, thereby restricting the rotational speed Nr of the engine 4 to a rotational speed in response to the 0% acceleration opening Aop.

The rotational-speed restricting section 32 can determine whether the forklift truck 1 is performing a switch-back operation on the basis of detection by the forward-backward lever switch 42 of a reversal operation performed on the forward-backward lever 42*a* to reverse the traveling direction of the forklift truck 1 while the truck is traveling. For example, while the forklift truck 1 is traveling forward, the forward-backward lever 42*a* is in the forward position. If the forward-backward lever 42*a* is switched to the backward position during the forward travel, in other words, if a reversal operation is performed on the forward-backward lever 42*a*, a switch-back operation can be determined. The reversal operation is performed on the forward-backward lever 42*a* to reverse the traveling direction of the forklift truck 1 from, for example, forward to backward, or from backward to forward.

The vehicle speed sensor 46 illustrated in FIG. 2 outputs a positive value as the vehicle speed Vc when the forklift truck 1 is traveling forward and a negative value as the vehicle speed Vc when the forklift truck 1 is traveling backward. The rotational-speed restricting section 32 multiplies the vehicle speed obtained from the vehicle speed sensor 46 through the filter 31 by +1 when the forward-backward lever 42*a* in the forklift truck 1 traveling backward is switched to the forward or neutral position, or when the forward-backward lever 42*a* in the forklift truck 1 traveling forward is switched to the neutral position. The rotational-speed restricting section 32 multiplies the vehicle speed obtained from the vehicle speed sensor 46 through the filter 31 by −1 when the forward-backward lever 42*a* in the forklift truck 1 traveling forward is switched to the backward position.

The rotational-speed restricting section 32 multiplies the output value Vcf of the filter 31, i.e. the vehicle speed Vc, by +1 if a switch-back operation is determined and if the forward-backward lever 42*a* is switched to the forward or neutral position, and gives the result to the table 50. The rotational-speed restricting section 32 multiplies the output value Vcf of the filter 31, i.e. the vehicle speed Vc, by −1 if a switch-back operation is determined and if the forward-backward lever 42*a* is switched to the backward position, and gives the result to the table 50. The rotational-speed restricting section 32 then obtains an upper limit Acmax corresponding to the vehicle speed Vc given to the table 50 and outputs the upper limit Acmax to the minor selecting section 34.

Figure 7:
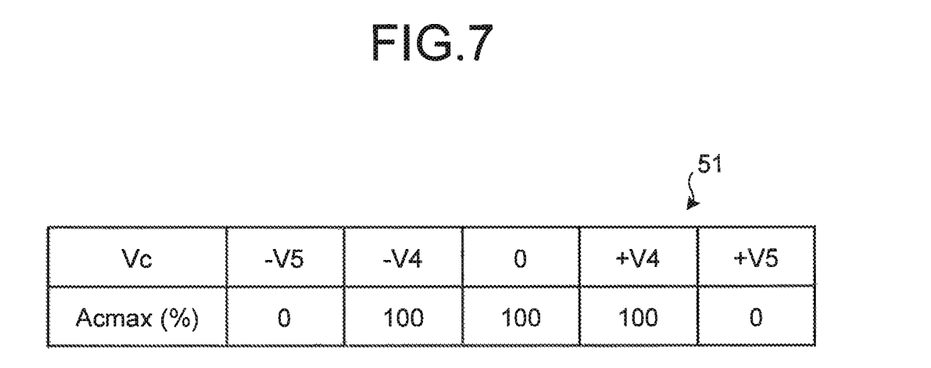
FIG. 7 is a diagram of a table to be used when a neutral position is selected during a switch-back operation of the forklift truck.
Figure 8:
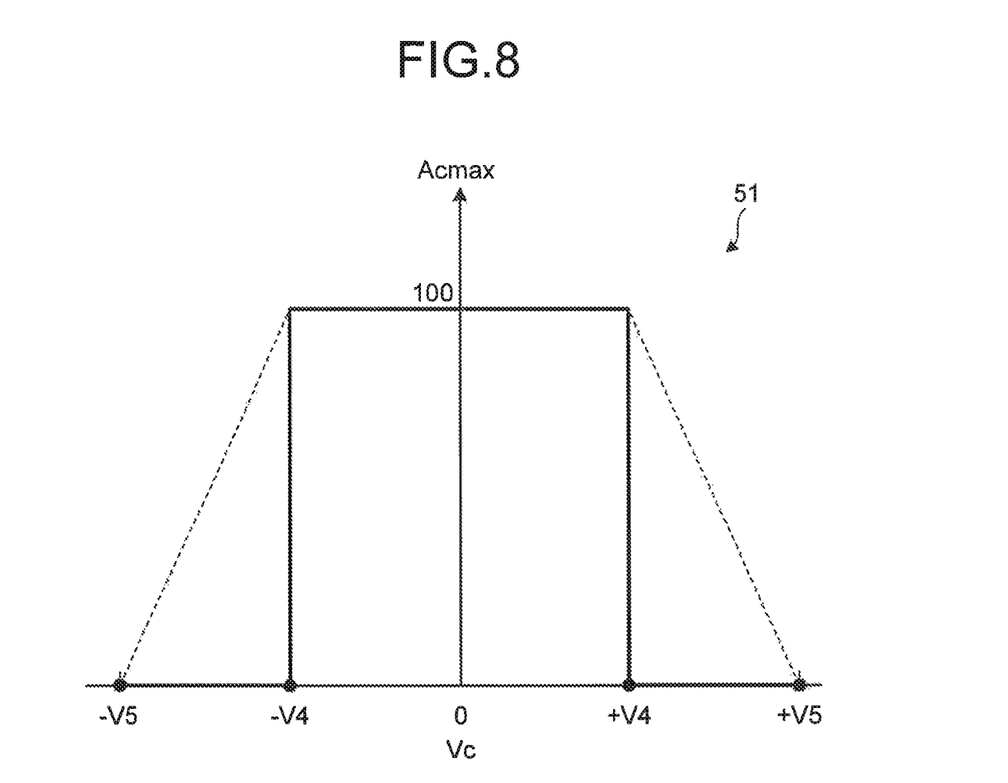
FIG. 8 is a graph plotted from the table illustrated in FIG. 7.

FIG. 7 is diagram of a table 51 to be used if the neutral position is selected during a switch-back operation of the forklift truck 1. FIG. 8 is a graph plotted from the table 51 illustrated in FIG. 7. The rotational-speed restricting section 32 uses, in the case where the forward-backward lever switch 42 senses that the forward-backward lever 42*a* has been operated into the neutral position while the forklift truck 1 is traveling, a setting in which the upper limit Acmax increases so as to be larger than the setting to be used when the reversal operation is detected, in a range to zero from the absolute value of the vehicle speed larger than the setting to be used when the reversal operation is detected. The table 51 illustrated in FIG. 7 sets the upper limit Acmax to 100% for the vehicle speed in a range from −V4 to +V4, the absolute values of which are larger than the absolute value of the vehicle speed −V3 in the table 50 illustrated in FIG. 5. The table 51 is stored in the storage unit 30M of the control device 30 illustrated in FIG. 2.

During a switch-back operation, traveling and load handling may be performed simultaneously. If the forward-backward lever 42*a* is operated into the neutral position as the vehicle speed Vc has been reduced, the rotational speed Nr of the engine 4 reduces. Thus, if the forward-backward lever 42*a* is operated into the neutral position, the rotational-speed restricting section 32 uses the table 51, in place of the table 50, to obtain the upper limit Acmax of the rotational speed Nr of the engine 4. The table 51 sets the upper limit Acmax to 100% in a wider range of the vehicle speed Vc than the table 50 and, thus, can curb a reduction in rotational speed Nr, which may be caused when the forward-backward lever 42a is operated into the neutral position.

As marked with a solid line in FIG. 8, the table 51 sets the upper limit Acmax to 100% for the vehicle speed Vc in a range from −V4 to +V4 inclusive and the upper limit Acmax to 0% for the vehicle speed Vc less than −V4 and more than +V4. Alternatively, as marked with a dotted line in FIG. 8, the table 51 may be set in a manner such that the upper limit Acmax gradually increases as the vehicle speed Vc increases in a range from −V5 to −V4 inclusive, and that the upper limit Acmax gradually decreases as the vehicle speed Vc increases in a range from +V4 to +V5 inclusive.

The switching section 33 is used to set an upper limit on the rotational speed Nr of the engine 4 when an abnormality has occurred in the vehicle speed sensor 46 illustrated in FIG. 2. In the event of an abnormality in the vehicle speed sensor 46, the vehicle speed sensor 46 outputs the vehicle speed Vc at 0 km/h, and thus, the rotational-speed restricting section 32 would obtain the upper limit Acmax at 100% from the table 50. This may reduce deceleration of the forklift truck 1 during a switch-back operation.

To set an upper limit on the rotational speed Nr of the engine 4 in the event of an abnormality in the vehicle speed sensor 46, the switching section 33, if it is determined that a switch-back operation is being performed, outputs a predetermined upper limit Act (referred to as a switch-back upper limit hereinafter) of the engine rotational speed. In this embodiment, the acceleration opening Aop is used for the switch-back upper limit Act. The switch-back upper limit Act will be a value smaller than A1, which is the minimum value of the upper limit Acmax, except for zero, set in the table 50, i.e. in the relationship between the vehicle speed Vc and the upper limit Acmax of the rotational speed Nr, for a reversal operation detected from the forward-backward lever 42a.

During the switch-back operation, the control device 30 changes a forward command signal Fwc for the forward pump electromagnetic proportional control valve 12 illustrated in FIG. 2 and a backward command signal Bkc for the backward pump electromagnetic proportional control valve 13. For example, if the forward-backward lever 42a in the forklift truck 1 traveling backward is switched to the forward position, the control device 30 reduces the backward command signal Bkc and increases the forward command signal Fwc. When the vehicle speed Vc achieves a certain value, the control device 30 then allows the backward command signal Bkc to reach zero. If the forward-backward lever 42a in the forklift truck 1 traveling forward is switched to the backward position, the control device 30 reduces the forward command signal Fwc and increases the backward command signal Bkc. When the vehicle speed Vc achieves a certain value, the control device 30 then allows the forward command signal Fwc to reach zero. During a switch-back operation, the switching section 33 determines that the switch-back operation is ongoing until the backward command signal Bkc or the forward command signal Fwc reaches zero.

The switching section 33, if it is determined that a switch-back operation is being performed, outputs the switch-back upper limit Act of the engine rotational speed to the minor selecting section 34. The switching section 33, if it is determined that a switch-back operation is not being performed, outputs the upper limit Acmax at 100% to the minor selecting section 34 so that the upper limit Acmax obtained from the table 50 is selected at the minor selecting section 34. The minor selecting section 34 determines the smaller of the switch-back upper limit Act, or the upper limit Acmax at 100%, and the upper limit Acmax obtained from the table 50, i.e. from the relationship set between the vehicle speed Vc and the upper limit Acmax of the rotational speed Nr for a reversal operation detected from the forward-backward lever 42a, and uses the determined value as an engine rotational speed upper limit Nrmax, which is an upper limit on the rotational speed Nr of the engine 4.

Through the switching section 33 and the minor selecting section 34, the control device 30 can set an upper limit on the rotational speed Nr of the engine 4 in the event of an abnormality in the vehicle speed sensor 46, thereby reducing the likelihood of reduced deceleration of the forklift truck 1 during a switch-back operation. As described above, the rotational-speed restricting section 32 determines whether the forklift truck 1 is performing a switch-back operation on the basis of the output value Vcf from the filter 31, which corresponds to the vehicle speed Vc, and the traveling direction command value DR. In other words, the rotational-speed restricting section 32 determines that a switch-back operation is not performed if the vehicle speed has changed from a positive value to zero and then to a negative value, or from a negative value to zero and then to a positive value. In contrast, the switching section 33 determines that a switch-back operation is not performed before the direction of the vehicle speed Vc is switched, on the basis of the fact that the backward command signal Bkc or the forward command signal Fwc has reached zero, and outputs the upper limit Acmax at 100% to the minor selecting section 34. As a result, after the switching section 33 has output the upper limit Acmax at 100% to the minor selecting section 34, the minor selecting section 34 selects the upper limit Acmax obtained by the rotational-speed restricting section 32 until the vehicle speed Vc reaches zero.

In this embodiment, the processing unit 30C of the control device 30 includes a fuel injection quantity calculating section 35. The fuel injection quantity calculating section 35 calculates the quantity of fuel to be injected by a fuel injector 41 of the engine 4 on the basis of the acceleration opening Aop sensed by the accelerator potentiometer 41 and the rotational speed Nr of the engine 4 sensed by the engine speed sensor 43. The fuel injection quantity calculating section 35 also obtains the engine rotational speed upper limit Nrmax from the minor selecting section 34 to calculate a fuel injection quantity Qf of the fuel injector 41 in a manner such that the upper limit on the rotational speed Nr of the engine 4 does not exceed the engine rotational speed upper limit Nrmax. The fuel injection quantity calculating section 35 outputs a command value for the fuel injection quantity Qf to the fuel injector 4I. The fuel injector 41 injects fuel by the fuel injection quantity Qf output by the fuel injection quantity calculating section 35 to the engine 4.

In this embodiment, for use during a switch-back operation of the forklift truck 1, the relationship between the vehicle speed Vc and the upper limit Acmax of the rotational speed Nr is set in a manner such that the upper limit Acmax of the rotational speed Nr of the engine 4 increases as the absolute value of the vehicle speed Vc of the forklift truck 1 approaches zero in a range. Through such a relationship, the control device 30 can curb acceleration during a switch-back operation, which is caused by the depression of the accelerator pedal 41a during the switch-back. Additionally, through the upper limit Acmax of the rotational speed Nr of the engine 4 provided during a switch-back operation of the forklift truck 1, the control device 30 can curb an increase in fuel consumption during the switch-back. In this embodiment in particular, the rotational speed Nr of the engine 4 is restricted to zero in a range, and thus, the control device 30 can curb an increase in fuel consumption during the switch-back effectively.

Additionally, the upper limit Acmax of the rotational speed Nr of the engine 4 is increased as the absolute value of the vehicle speed Vc of the forklift truck 1 approaches zero, and, furthermore, the upper limit Acmax is not provided for the vehicle speed Vc at zero. Through such setting, the control device 30 can provide improved responsiveness with which the engine 4 increases its rotational speed in response to the operation on the accelerator pedal 41*a* when the traveling direction of the forklift truck 1 is actually reversed. Hence, the control device 30 enables the rotational speed Nr of the engine 4 to be increased promptly at the timing when the traveling direction of the forklift truck 1 is switched, allowing smooth transition from backward to forward or from forward to backward. Additionally, the upper limit Acmax of the rotational speed Nr of the engine 4 is not provided for the vehicle speed Vc at zero, and thus, the forklift truck 1 can start load handling operations promptly after stopping.

<Control Example>

The control device 30 determines an operation on the forward-backward lever 42*a* through the forward-backward lever switch 42 during the travel of the forklift truck 1. If the forward-backward lever switch 42 has sensed the operation on the forward-backward lever 42*a* to reverse the traveling direction of the traveling forklift truck 1, the rotational-speed restricting section 32 of the control device 30 gives the vehicle speed Vc sensed by the vehicle speed sensor 46 to the relationship set in the table 51 between the vehicle speed Vc and the upper limit Acmax of the rotational speed Nr of the engine to obtain a corresponding upper limit Acmax and outputs the obtained upper limit Acmax to the minor selecting section 34. The switching section 33, if it is determined that the switch-back is being performed, outputs the switch-back upper limit Act to the minor selecting section 34. The minor selecting section 34 determines the smaller of the upper limit Acmax obtained by the rotational-speed restricting section 32 and the switch-back upper limit Act output from the switching section 33, and uses the determined value as the engine rotational speed upper limit Nrmax. The fuel injection quantity calculating section 35 obtains the engine rotational speed upper limit Nrmax from the minor selecting section 34 and controls the engine 4 so that the upper limit of the rotational speed Nr of the engine 4 does not exceed the engine rotational speed upper limit Nrmax.

Although the embodiment has been described in a manner described above, the embodiment is not limited to the description. Additionally, the components described above include those a person skilled in the art can readily envisage and those substantially identical or in the so-called equivalent range. Furthermore, the components described above can be combined as appropriate. Furthermore, at least one of various omissions, replacements, and modifications can be made to the components without departing from the spirit of the embodiment. The work vehicle is not limited to the forklift truck 1 and may be any work vehicle provided with wheels, for example, a wheel loader.

REFERENCE SIGNS LIST

1 forklift truck
4 engine
4I fuel injector
5 implement
6 fork
10 travel hydraulic pump
10S swash plate
10*a*, 10*b* hydraulic supply line
11 pump displacement setting unit
12 forward pump electromagnetic proportional control valve
13 backward pump electromagnetic proportional control valve
14 pump displacement controlling cylinder
15 charge pump
16 implement hydraulic pump
20 hydraulic motor
20S swash plate
21 motor displacement setting unit
30 control device
30C processing unit
30M storage unit
31 filter
32 rotational-speed restricting section
33 switching section
34 minor selecting section
35 fuel injection quantity calculating section
41 accelerator potentiometer
41*a* accelerator pedal
42 forward-backward lever switch
42*a* forward-backward lever
43 engine speed sensor
46 vehicle speed sensor
50 table
51 table
100 main hydraulic circuit

The invention claimed is:

1. A work vehicle provided with an implement, the work vehicle comprising:
    an engine;
    a variable displacement travel hydraulic pump configured to be driven by the engine;
    a hydraulic motor forming a closed circuit with the travel hydraulic pump and configured to be driven by hydraulic fluid discharged from the travel hydraulic pump;
    a driven wheel configured to be driven by the hydraulic motor to allow the work vehicle to travel;
    a selector switch configured to detect an operating state of a traveling direction switching device configured to switch a traveling of the work vehicle between forward and backward; and
    a control device configured to set, in a case in which the selector switch detects a reversal operation of the traveling direction switching device to reverse a traveling direction of the work vehicle when the work vehicle travels, a relationship between a vehicle speed of the work vehicle and an upper limit of a rotational speed of the engine in a manner such that the upper limit increases as an absolute value of the vehicle speed approaches zero, the control device being configured to obtain an upper limit of a rotational speed of the engine from the set relationship and a vehicle speed of the work vehicle.

2. The work vehicle according to claim 1,
    wherein the control device sets, in a case in which the selector switch detects that the traveling direction switching device is operated into a neutral position when the work vehicle travels, the upper limit of the rotational speed of the engine to increase so as to be larger than when the reversal operation is detected, in a range to zero from an absolute value of a vehicle speed larger than when the reversal operation is detected.

3. The work vehicle according to claim 1,
wherein the control device uses, in a case in which an abnormality has occurred in a device that detects the vehicle speed and in which the reversal operation is detected, the smaller of a predetermined upper limit of the rotational speed of the engine and a rotational speed of the engine obtained from a upper limit set in the relationship for use when the reversal operation is detected and the vehicle speed.

4. The work vehicle according to claim 1, wherein the relationship for use when the reversal operation is detected is set in a manner such that the upper limit of the rotational speed of the engine is zero in a range to a first vehicle speed and that the upper limit of the rotational speed of the engine increases as the absolute value of the vehicle speed approaches zero in a range from the first vehicle speed, inclusive, to zero.

5. The work vehicle according to claim 1, wherein the work vehicle is a forklift truck.

6. The work vehicle according to claim 1, wherein the upper limit defined as a percentage is continuously increased from 0% to 100% as an absolute value of the vehicle speed is decreased from an absolute value of a predetermined vehicle speed to zero.

7. A method of controlling a work vehicle, the work vehicle including an implement, an engine, a variable displacement travel hydraulic pump configured to be driven by the engine, a hydraulic motor forming a closed circuit with the travel hydraulic pump and configured to be driven by hydraulic fluid discharged from the travel hydraulic pump, a driven wheel configured to be driven by the hydraulic motor, a selector switch configured to detect an operating state of a traveling direction switching device configured to switch traveling of the work vehicle between forward and backward, the method comprising:
detecting an operation on the traveling direction switching device when the work vehicle travels;
setting, in a case in which the selector switch detects a reversal operation of the traveling direction switching device to reverse a traveling direction of the work vehicle when the work vehicle travels, a relationship between a vehicle speed of the work vehicle and an upper limit of a rotational speed of the engine in a manner such that the upper limit increases as an absolute value of the vehicle speed approaches zero; and
obtaining an upper limit of a rotational speed of the engine from the relationship and a vehicle speed of the work vehicle.

* * * * *